United States Patent

Moring

[11] 3,963,047
[45] June 15, 1976

[54] FILL AND RELIEF VALVE ARRANGEMENT

[75] Inventor: Rodger L. Moring, Bristol, Ill.

[73] Assignee: Caterpillar Tractor Co., Peoria, Ill.

[22] Filed: Sept. 17, 1975

[21] Appl. No.: 614,053

[52] U.S. Cl. .............................. 137/596; 91/432; 91/449; 305/10
[51] Int. Cl.² .................. F15B 13/04; B62D 55/30
[58] Field of Search .............. 91/432, 449; 137/596; 305/10

[56] References Cited
UNITED STATES PATENTS 3,924,904  12/1975  Wagner et al. ................ 91/449 X

*Primary Examiner*—Alan Cohan
*Assistant Examiner*—Gerald A. Michalsky
*Attorney, Agent, or Firm*—John W. Grant

[57] ABSTRACT

A fill and relief valve arrangement for the introduction of fluid into and the selective venting of fluid from a fluid chamber includes a body having a stepped open-ended bore extending therethrough and an annular shoulder formed at one end of the bore. A valve seat element is sealingly secured within the other end of the bore and has a passage formed therein communicating with a passageway which communicates the bore with the fluid chamber. A fill valve is adjustably positioned within the bore and has a first position in engagement with a valve seat element for isolating the fluid chamber from a vent port open to the atmosphere and a second position for establishing communication between the passageway and the vent port for venting the fluid chamber to the atmosphere. The fill valve is confined between the valve seat element and the annular shoulder.

10 Claims, 3 Drawing Figures

FILL AND RELIEF VALVE ARRANGEMENT

BACKGROUND OF THE INVENTION

Hydraulic track adjusters used on crawler tractors between the recoil spring and the idler commonly have a variable volume fluid chamber into which grease or oil is added to extend a rod or piston for tightening the track chain to compensate for wear to the track components. Many such track adjusters include a fill valve for adding pressurized fluid to the chamber and a separate relief valve for venting the chamber in preparation for disassembling the track chain. Occasionally, mud or dirt will become packed between the track and idler and/or sprocket compressing the recoil spring and generating tremendous pressure in the fluid in the chamber. To prevent the fill valve from being expelled by the pressurized fluid should it be removed without venting the pressure, various devices have since been employed to insure that the fluid pressure in the chamber is relieved prior to disassembling the track adjuster or the complete removal of either the fill or relief valves. Such devices include the addition of retainer shields to prevent the complete removal of the fill valve or relief valve until the pressure is relieved, or the addition of bleed holes to vent the chamber to the atmosphere before either the fill valve or relief valve is removed, or a combination of both devices. Although such devices have been highly successful in alleviating the above problems, they are not readily adaptable to some types of hydraulic track adjusters.

OBJECTS OF THE INVENTION

Accordingly, an object of this invention is to provide an improved fill and relief valve arrangement for a hydraulic track adjuster.

Another object of this invention is to provide such an improved fill and relief valve which combines the function of both a fill valve and a relief valve into a single assembly for the selective introduction of fluid into and the venting of fluid from a high pressure fluid chamber.

Another object of this invention is to provide such an improved fill and relief valve arrangement which is mounted in such a manner that the valve cannot be removed during a normal pressure relieving operation.

Another object of this invention is to provide an improved fill and relief valve arrangement of the character described which automatically vents the fluid chamber prior to any of the elements being completely removed from their assembled position.

Other objects and advantages of the present invention will become more readily apparent upon reference to the accompanying drawing and following description.

DESCRIPTION OF THE PREFERRED EMBODIMENT

Figure 1:
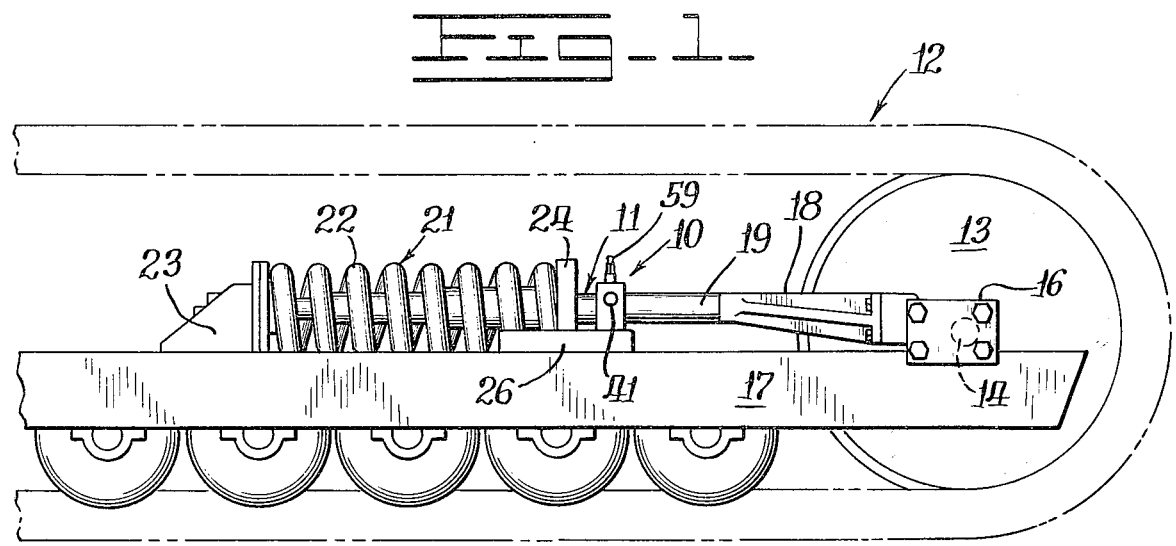
FIG. 1 is a side elevational view of a fill and relief valve arrangement embodying the principles of the present invention in association with a hydraulic track adjuster of a crawler track assembly.

Referring now to the drawing, a fill and relief valve arrangement embodying the principles of the present invention is generally indicated by the reference numeral 10 in association with a hydraulic track adjuster 11 of a crawler track assembly 12. The track assembly includes an idler 13 rotatably mounted on a shaft 14 the ends of which are secured to a pair of brackets, one shown at 16, slidably mounted on the forward end of a track roller frame 17. A yoke 18 is secured to the brackets and has a rearwardly extending rod 19. A recoil mechanism 21 is mounted on the track roller frame rearwardly of the idler in the usual manner. The recoil mechanism includes a recoil spring 22 disposed in a compressed condition between a bulkhead 23 secured to the track roller frame and a slidable spring seat 24 which is normally in engagement with a pair of stops, one shown at 26.

The spring seat also forms a part of the hydraulic track adjuster 11 and has a blind bore 27 formed therein opening toward the idler 13. An elongated tubular portion 28 of a body 29 slidably extends into the bore in telescopic fashion creating a variable volume fluid chamber 31. An open-ended stepped bore 32 extends through the body normal to the tubular portion and has a first threaded portion 33 at one end, an axially adjacent smooth bore portion 34, a second threaded portion 36 and a reduced diameter bore portion 37 at the other end. An annular shoulder 38 joins the second threaded portion and the reduced diameter bore portion. A passageway 39 connects the first threaded portion with the fluid chamber through the tubular portion. A pair of vent ports 41 communicate the second threaded portion with the atmosphere with each vent port having a flared portion 42 formed at its outer end.

A valve seat element 43 has an externally threaded portion 44 screw threaded into the first threaded portion 33 and a reduced diameter portion 46 protruding into the smooth bore portion 34. An annular O-ring seal 47 is seated in an annular groove 48 formed in the reduced diameter portion and seals against the smooth bore portion forming an annular chamber 49 which is connected to the fluid chamber 31 through the passageway 39. A conical valve seat 51 is formed in the inwardly disposed end of the valve seat element and is connected to the annular chamber through a passage 52 in the valve seat element. A longitudinally extending slot 53 is formed in the periphery of the threaded portion and opens into the annular chamber.

A fill valve 56 has an externally threaded portion 57 screw theaded into the second threaded portion 36 and a stem 58 extending through the reduced diameter bore portion 37. The stem terminates in a generally spherical protuberance 59 of a size and shape for receiving a standard grease gun nozzle. A conical tapered end portion 61 is formed on the lower end of the fill valve and is adapted for sealing engagement with the valve seat 51 to isolate the passageway 39 from the vent ports 41. A fluid flow path 62 extends axially through the fill valve and has a check valve 63 disposed therein for permitting one-way communication of fluid therethrough in a direction for introducing fluid into the fluid chamber when the end portion of the fill valve is seated against the valve seat.

A plate 66 is secured, as by welding, to the track roller frame such that in the assembled position as shown the valve seat element 43 is disposed above the plate which thus prevents the removal of the valve seat element.

A bore 67 is formed in the face of the body 29 adjacent the idler 13 and receives the end of the rod 19 of the yoke 18.

OPERATION

Figure 2:
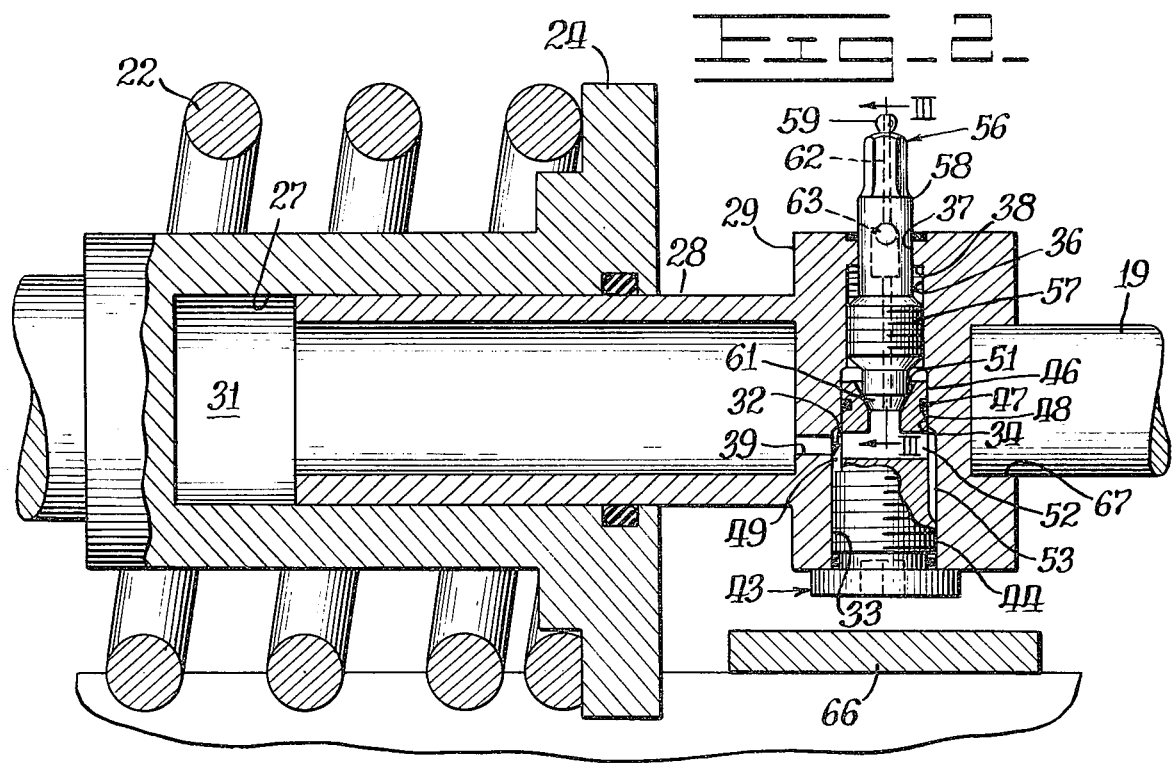
FIG. 2 is an enlarged longitudinal sectional view of a fill and relief valve arrangement.
Figure 3:
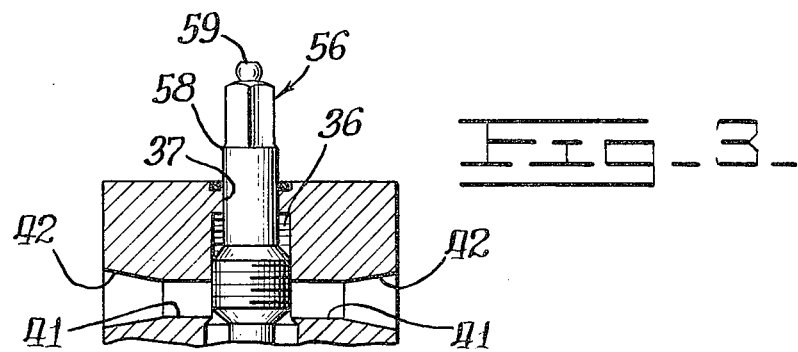
FIG. 3 is a sectional view taken along line III—III of FIG. 2.

While the operation of the present invention is believed clearly apparent from the foregoing description, further amplification will subsequently be made in the following brief summary of such operation. The fill valve 56 and valve seat element 43 are preassembled within the stepped bore 32 of the body 29 in the following order prior to the tubular portion 28 of the body being inserted into the bore 27 of the spring seat 24. First, the fill valve is inserted into the bore from the lower side as viewed in FIG. 2 so that the stem 58 protrudes through the reduced diameter bore portion 37. The external threaded portion 57 is screw threaded into the second threaded portion 36 until the upper portion thereof abuts the annular shoulder 38. The valve seat element is then inserted into the stepped bore by screw threading the external threaded portion 44 thereof into the first threaded portion 33. The fill valve is then rotated in the appropriate direction so that it is moved toward the valve seat element until the tapered end portion 61 seats against the valve seat 51. With the fill valve and valve seat element thus assembled, the tubular portion is inserted into the bore 27.

In operation, the fluid chamber 31 is filled with oil or grease with the hydraulic track adjuster 11 thus functioning as a solid link between the yoke 18 and the recoil mechanism 21. When the track chain of the crawler track assembly 12 becomes slack due to wear, additional grease or oil is pumped through the fluid flow path 62 and past the check valve 63 of the fill valve, through the passage 52 and passageway 39 into the chamber 31. The additional grease or oil forces the body 29 to the right as viewed in FIG. 1, thereby moving the yoke 18, brackets 16, and idler 13 to the right thereby removing the slack from the track chain.

When the track chain becomes too tight or when it becomes necessary to vent the chamber 31 in preparation for disassembling the crawler track assembly, the fill valve 56 is rotated in the appropriate direction to unseat the tapered end portion 61 from the valve seat 51 of the valve seat element 43. In so doing, communication is established between passage 52 and the vent ports 42 thereby venting the fluid chamber 31 to the atmosphere to relieve any fluid pressure generated in the chamber by the tension in the track chain. The flared portions 42 of the vent ports aids in the removal of mud or foreign matter which may become packed within the vent ports. In the assembled position as shown, the annular shoulder 38 limits the degree of opening of the fill valve and mechanically prevents the complete removal of the fill valve.

The plate 66 will normally prevent the removal of the valve seat element 43 when the hydraulic track adjuster 11 is in its assembled position as shown. However, should the fill and relief valve arrangement be incorporated in a design not having a similar plate, the slot 53 will automatically vent the chamber 31 to the atmosphere to relieve any fluid pressure in the chamber before the external threaded portion 44 is disengaged from the first threaded portion 33.

In view of the foregoing, it is readily apparent that the structure of the present invention provides an improved fill and relief valve arrangement which functions as both a fill valve and a relief valve for the selective introduction of fluid into and venting of fluid from a fluid chamber. In its normal assembled position of the fill valve, the fluid chamber is vented by rotating the fill valve in a direction toward an annular shoulder which mechanically prevents the complete removal of the fill valve. Likewise, the longitudinal slot in the valve seat element will automatically vent the fluid chamber prior to the complete removal of the valve element if it is removed before the fluid pressure is relieved from the fluid chamber by the manipulation of the fill valve.

While the invention has been described and shown with particular reference to the preferred embodiment, it will be apparent that variations might be possible that would fall within the scope of the present invention, which is not intended to be limited except as defined in the following claims.

What is claimed is:

1. A fill and relief valve arrangement for the introduction of fluid into and the selective venting of fluid from a fluid chamber comprising;

a body having a stepped open-ended bore extending therethrough, an integral annular shoulder formed at one end of the bore, a passageway communicating the bore with such fluid chamber, and a vent port communicating the bore with the atmosphere;

a valve seat element sealingly secured within the other end of the bore and having a passage formed therein communicating with said passageway; and a fill valve adjustably positioned within the bore and having a first position in engagement with said valve seat element for isolating the fluid chamber from the vent port and a second position for establishing communication between the passageway and the vent port through said passage for venting the fluid chamber to the atmosphere, said fill valve including a fluid flow path extending therethrough and a check valve disposed in the flow path for permitting oneway communication of fluid therethrough in a direction for introducing fluid into the fluid chamber when the fill valve is in said first position, said fill valve being confined between the valve seat element and the annular shoulder.

2. The fill and relief valve arrangement of claim 1 wherein said stepped open-ended bore includes a first threaded portion at said other end and a second threaded portion adjacent said annular shoulder, said valve seat element having an externally threaded portion screw threaded into the first threaded portion, said fill valve having an externally threaded portion screw threaded into the second threaded portion.

3. The fill and relief valve arrangement of claim 2 wherein said stepped open-ended bore includes a reduced diameter portion at said one end, said fill valve having a stem protruding through said reduced diameter portion with said externally threaded portion of the fill valve being confined within the second threaded portion.

4. The fill and relief valve arrangement of claim 3 wherein said valve seat element has a slot formed in said externally threaded portion thereof, said slot being positioned for communicating the passageway with the atmosphere before the externally threaded portion is disengaged from the first threaded portion of the stepped bore.

5. The fill and relief valve arrangement of claim 4 wherein said stepped bore includes a smooth bore portion disposed axially between said first and second threaded portions, said valve seat element having a reduced diameter portion sealingly disposed in said smooth bore portion for preventing communication between said passageway and said vent port when said fill valve is in said first position.

6. The fill and relief valve arrangement of claim 5 wherein said valve seat element has a conical valve seat formed therein, said fill valve having a tapered end portion adapted for sealing engagement with said valve seat.

7. A fill and relief valve arrangement for the introduction of fluid into and the selective venting of fluid from a variable volume fluid chamber of a hydraulic track adjuster, comprising;
  a body having a first bore, a second bore concentric with and smaller in diameter than the first bore, an integral annular shoulder joining the first and second bores, a threaded portion formed in said first bore adjacent to said shoulder, a vent port communicating the first bore with the atmosphere, and a passageway connecting the fluid chamber with the first bore;
  a valve seat element sealingly secured within the first bore and having a valve seat formed in its inwardly disposed end and a passage communicating the valve seat with the passageway in the body; and
  a fill valve having a fluid flow path extending axially therethrough, an externally threaded portion screw threaded into the threaded portion of the first bore, an end portion in sealing engagement with the valve seat isolating the passageway from the vent port, a stem protruding through the second bore, and a check valve disposed in the fluid flow path for permitting one-way communication therethrough for directing pressurized fluid into the fluid chamber when the end portion is in seating engagement with the valve seat, said fill valve being rotatable to separate the end portion from said valve seat for venting the fluid chamber to the atmosphere through the vent port, said fill valve being trapped between the valve seat element and said annular shoulder of said body for preventing inadvertent removal of the fill valve.

8. The fill and relief valve arrangement of claim 7 wherein said first bore includes another threaded portion, said valve seat element having an externally threaded portion screw threaded into said other threaded portion.

9. The fill and relief valve arrangement of claim 8 wherein said valve seat element has a slot formed in said externally threaded portion, said slot being positioned for establishing communication between said passageway and the atmosphere before the threaded portion is disengaged from the other threaded portion.

10. The fill and relief valve arrangement of claim 9 including a plate disposed adjacent to the valve seat element for preventing its removal from the first bore.

* * * * *